Aug. 28, 1923.
C. E. BYRNE ET AL
1,466,157
SPOOL FOR PHOTOGRAPHIC FILMS AND THE LIKE
Filed March 1, 1922
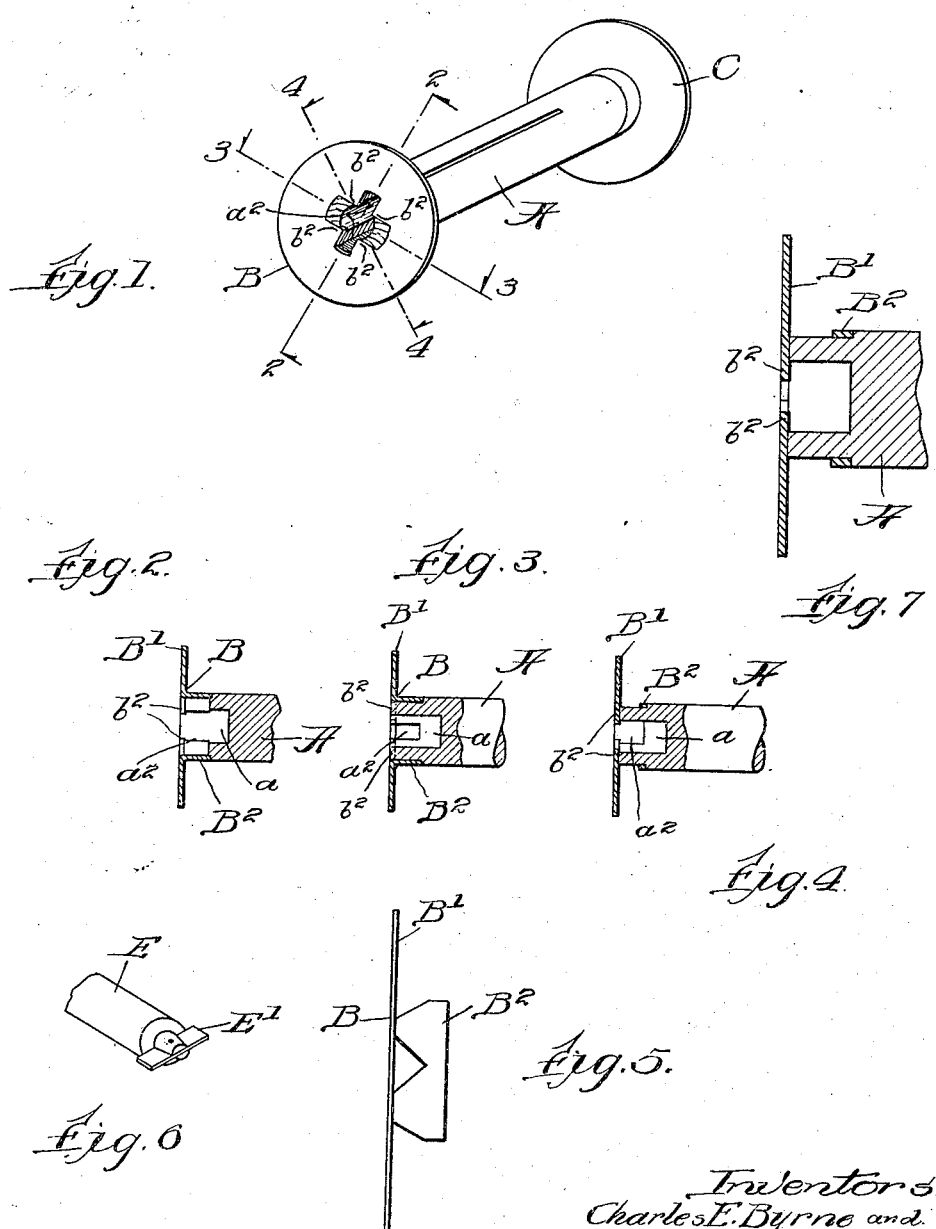
Inventors:
Charles E. Byrne and
Joseph Sherwin Murphy,
by Burton & Burton
their attys.

Patented Aug. 28, 1923.

1,466,157

UNITED STATES PATENT OFFICE.

CHARLES E. BYRNE AND JOSEPH SHERWIN MURPHY, OF CHICAGO, ILLINOIS.

SPOOL FOR PHOTOGRAPHIC FILMS AND THE LIKE.

Application filed March 1, 1922. Serial No. 540,115.

*To all whom it may concern:*

Be it known that we, CHARLES E. BYRNE and JOSEPH SHERWIN MURPHY, both citizens of the United States, residing in the city of Chicago, county of Cook, and State of Illinois, have invented certain new and useful Improvements in Spools for Photographic Films and the like, of which the following is a specification, reference being had to the accompanying drawings, forming a part thereof.

The purpose of this invention is to provide a reel or spool for photographic films and the like including such spooled strips as perforated note sheets for automatic players, commonly called "music rolls."

It consists in the elements and features of construction shown and described as indicated by the claims.

In the drawings:—

Figure 1 is a perspective view of the spool or reel embodying this invention, which in a small size would be suitable for a photographic film and in a larger size for a perforated note sheet or music roll.

Figure 2 is a detail section of one end portion of the spool or reel axial with respect thereto, as at the line, 2—2, on Figure 1.

Figure 3 is a similar detail axial section at the line, 3—3 on Figure 1.

Figure 4 is a detail axial section at the line, 4—4, on Figure 1.

Figure 5 is an edge elevation of the head or flange and ferrule member of the spool detached from the shaft.

Figure 6 is a perspective view of the spool engaging portion of the drive shaft or winding head for rotating the spool.

Figure 7 is a sectional detail similar to Figure 4 showing a slight detail modification suitable in larger spools.

The construction shown in the drawings comprises a cylindrical spool shaft, A, which is customarily and desirably made of wood for winding a film or strip to be carried by the spool or reel. B and C are the head or flange members for the two ends of the spool, the member, B, being the one at the driving end, that is the end at which the spool is engaged by a rotating shaft or key for rotating, in winding or unwinding the film.

The characteristic of this invention is the construction of this head or flange member for affording a driving connection with the customary form of terminal of the driving shaft or winding key shown in Figure 6. For this purpose the winding key, E, includes a cross-head, $E^1$. In forms of spools or reels for the purposes indicated, it has been customary to provide the head or end of the shaft with a central bore for centering it on the driving shaft or key and a transverse slot or recess to accommodate the cross-head, $E^1$, of the driving shaft or key. It is of common experience in the operation of these devices that the cross-head after short use cuts away the wood and enlarges the aperture so that the engagement for driving is insecure and unreliable. This defect it is the purpose of the present invention to obviate by providing the spool with a metal head or flange, apertured for admitting the center terminal of the shaft and the cross-head so that the engagement for driving will be of metal with metal. This is effected by making the spool head or flange, B, comprising the disk, $B^1$, which is the head or spool flange proper, and a cylindrical annular flange, $B^2$, concentric with the disk projecting from one side thereof and being of the nature of a ferrule which is fitted snugly onto the end of the spool shaft, as seen in Figures 2 and 3. The annular flange, $B^2$, is formed in a manner familiar to workers in sheet metal, by striking it up and stretching it into cylindrical form from a flat disk blank. This obviously leaves the spool head with a central aperture of the full diameter of the end of the spool shaft into which the ferrule flange, $B^2$, is to be fitted. But for the purpose of producing the driving engagement described, there are struck out from the ferrule flange at intervals of substantially 90° in the circumference of the same, four right-angular lugs, $b^2$, which are folded out into the plane of the disk so that they stand in said plane as right angular projections into the otherwise circular central aperture, thus making the disk to comprise two oblong and substantially rectangular slots intersecting each other, making an X-shaped aperture. The spool shaft has the end upon which the driving flange, B, is mounted provided with the usual central bore, $a$, for centering on the key or drive shaft, and the usual transverse oblong slot, $a^2$, to accommodate the cross-head of the key or shaft; and the head, B, is mounted on the spool shaft with this recess or slot, $a^2$, exposed through one of the oblong apertures in the disk, $B^1$, so that the cross-head entered through this aperture in the metal and engaging therewith is accommodated without necessity of engaging the sides of the recesses, $a^2$, in the end of the wooden spool shaft; and in the case of larger spools, as those for music rolls, the wood may be bored out, that is the recess may be circular with a diameter as great as the length of the cross-head, as seen in Figure 6.

We claim:—

1. A spool for photographic films and the like comprising in combination a cylindrical spool shaft for winding the film, a head or end flange member consisting of a disk having projecting at one side an annular flange formed up from the central area of the disk, and adapted to be applied as a ferrule on the end of the spool shaft, the disk having situated within the circle of said annular flange and diametrically with respect thereto an oblong aperture, the spool shaft having an end recess which is exposed at the area of said aperture when said shaft end is entered into the ferrule-like flange.

2. In the construction defined in claim 1, foregoing, the spool head or flange member having a central aperture interrupted by intruding projections struck in from the annular ferrule-flange and folded out into the plane of the disk.

3. In the construction defined in claim 1, foregoing, the spool head or flange member having a central circular aperture interrupted by four radially intruding angular projections struck from the annular flange and folded out into the plane of the disk at approximately 90° intervals about the axis, whereby their edges stand in two pairs of substantially parallel lines crossing each other, forming two intersecting oblong apertures.

In testimony whereof, we have hereunto set our hands at Chicago, Illinois, this 5th day of December, 1921.

CHARLES E. BYRNE.
JOSEPH SHERWIN MURPHY.